(12) United States Patent
Guterman

(10) Patent No.: US 7,529,369 B2
(45) Date of Patent: May 5, 2009

(54) DATA PROCESSING WITH A KEY

(75) Inventor: Pascal Guterman, Roquevaire (FR)

(73) Assignee: Gemalto SA, Gemenos (FR)

( * ) Notice: Subject to any disclaimer, the term of this patent is extended or adjusted under 35 U.S.C. 154(b) by 521 days.

(21) Appl. No.: 10/311,693

(22) PCT Filed: Jun. 20, 2001

(86) PCT No.: PCT/FR01/01942

§ 371 (c)(1),
(2), (4) Date: Dec. 19, 2002

(87) PCT Pub. No.: WO01/99335

PCT Pub. Date: Dec. 27, 2001

(65) Prior Publication Data

US 2003/0179884 A1    Sep. 25, 2003

(30) Foreign Application Priority Data

Jun. 20, 2000    (FR) .................................. 00 07887

(51) Int. Cl.
*H04L 9/00* (2006.01)
(52) U.S. Cl. ...................................................... 380/44
(58) Field of Classification Search ............... 380/44, 380/46, 277; 713/171, 172, 194; 726/9
See application file for complete search history.

(56) References Cited

U.S. PATENT DOCUMENTS

| 4,757,534 | A | * | 7/1988 | Matyas et al. ................. 705/56 |
| 5,412,723 | A | * | 5/1995 | Canetti et al. ............... 713/155 |
| 5,644,638 | A | * | 7/1997 | Thiriet ....................... 713/193 |
| 6,018,581 | A | * | 1/2000 | Shona et al. .................. 380/46 |
| 6,163,612 | A | * | 12/2000 | Takeda et al. ............... 380/285 |
| 6,631,471 | B1 | * | 10/2003 | Ohki et al. .................. 713/193 |
| 6,715,078 | B1 | * | 3/2004 | Chasko et al. .............. 713/193 |

FOREIGN PATENT DOCUMENTS

WO        WO 00/16272        3/2000

* cited by examiner

*Primary Examiner*—Emmanuel L Moise
*Assistant Examiner*—Ali S Abyaneh
(74) *Attorney, Agent, or Firm*—Buchanan Ingersoll & Rooney PC

(57) ABSTRACT

In a data processing device, a first key is produced based on a secret key so that the latter is never used in a clear form. In a preliminary step, the secret key and a random number are applied to a function producing a first key. The first key and the random number are pre-stored in the device. For each data processing, the first key and another random number are applied to another function to produce a second key, and the second key and the stored number are applied as inverse of the function to produce a third key used for processing the data. The device can be a smart card and the data the confidential code presented to the card.

12 Claims, 4 Drawing Sheets

DATA PROCESSING WITH A KEY

This disclosure is based upon French Application No. 00/07887, filed on Jun. 20, 2000 and International Application No. PCT/FR01/01942, filed Jun. 20, 2001, the contents of which are incorporated herein by reference.

BACKGROUND OF THE INVENTION

The present invention concerns in general terms any electronic data processing means in which data have to be processed by means of a secret key.

For example, the data processing concerns an enciphering of the data according to a predetermined enciphering algorithm. The data are enciphered block by block. For each data block, the secret key constitutes the enciphering key and is applied to the algorithm with the data block in order to produce enciphered data.

The data processing means, in general a microcontroller, for example included in a terminal or in a smart card, contains a read only memory in which the enciphering key is prestored when the processing means is manufactured.

To take cognisance of the data which are enciphered, it is known that an attacker, an ill-intentioned person, seeks to read the enciphering key in the processing means, or to make an analysis of the electrical consumption by connecting a voltage-measuring apparatus to the electrical interface between the processing means and the outside world, or at a bus internal to the processing means when it is accessible.

So as to guard against such an attack, it is known how to apply a first random number and the enciphering key to a predetermined logic function in order to produce a processing key so as to execute the enciphering algorithm with this processing key. Thus, each time a data block is to be enciphered, a first random number is generated and an enciphering key is produced different from the enciphering keys for the previous encipherings. This enciphering method makes it much more difficult for an attacker to seek the enciphering key, since the processing key used at each enciphering is by nature random.

However, this known method manipulates the enciphering key in clear in the memory of the processing means.

SUMMARY OF THE INVENTION

The objective of the invention is to remedy the vulnerability of the secret key in the data processing means in order to make it inaccessible.

To this end, a method for processing data with a first key in a data processing means is characterised in that it comprises, beforehand and once for all the data processings, an application of a secret key and a first random number to a first function in order to produce the first key in the processing means, and prestorage of the first key and first random number in the processing means.

Although the first key serving for the data processing depends on the secret key and the first random number, the secret key is not stored in the processing means, and the first key produced is stored in advance. At each data processing, the secret key is thus not used or converted in clear.

For example, the first and second functions are exclusive-OR functions, and the data processing is a data enciphering.

According to a first preferred embodiment of the invention, the method comprises, for each data processing, a generation of a second random number, an application of the first key and second random number generated to a second function in order to produce a second key, and an application of the second key and the prestored first random number to a function which is the inverse of the first function in order to produce a third key used for the data processing.

According to a second preferred embodiment of the invention, the method is particularly advantageous for the verification of a confidential code, constituting the data to be processed, presented to the data processing means, such as a smart card. The confidential code presented and the second random number generated are then applied to the second function in order to produce a transformed presented code, in parallel to the applications relating to the first key, and the data processing comprises a comparison of the third key and the transformed presented code.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which.

DETAILED DESCRIPTION

Figure 1:
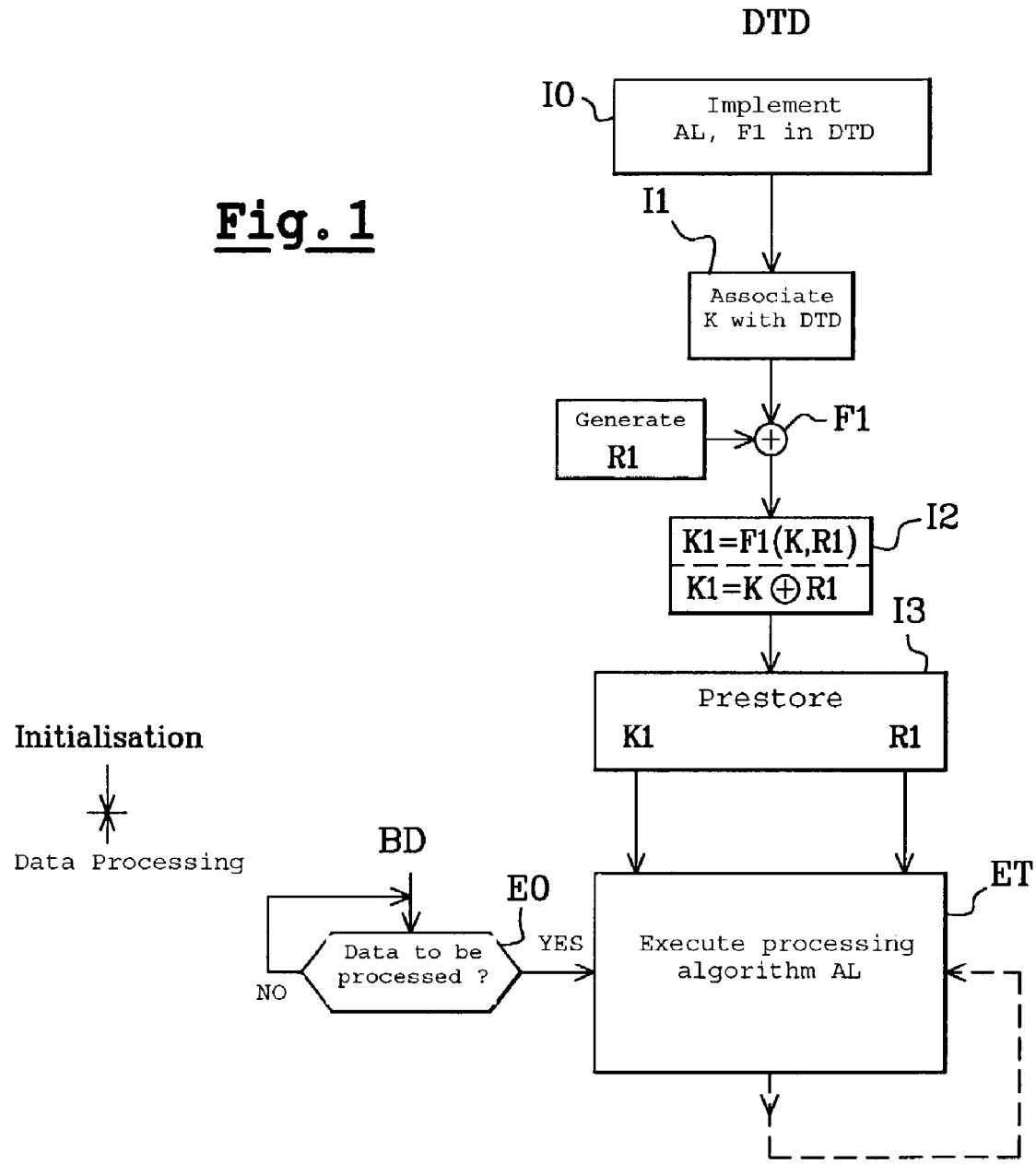
FIG. 1 is an algorithm of the main steps of the data processing method according to the invention.

As is clear from FIG. 1, the data processing method according to the preferred embodiment of the invention comprises in advance initialisation steps I1 to I3 for determining, as a function of a secret key K, a first key K1, referred to as the processing key, to be stored in an electronic data processing device DTD, and a cyclic data processing step ET each time data are to be processed in the device DTD, as indicated at an initial step E0 in FIG. 1. For example, when the data processing device is a smart card, the supplier of the data processing device can himself execute the initial steps I1 to I3 in a card marketing bureau, when each card is acquired, for example at the time of subscription to a service accessible to the functionalities of the card, or as a variant when the card itself is manufactured.

In advance, care has been taken that, at a first step I0, a processing algorithm AL and a function F1 characteristic of the invention are implemented in the memory of the processing device.

At the initial step I1, a secret key K is determined and written in random access memory RAM in the data processing device DTD, for example according to data formed by the manufacturer of the device. Then, immediately at the following step I2, a first random number R1 is generated and applied with the secret key K to the first function F1 in order to produce the processing key K1.

At the end of the initialisation at step I3, the processing key K1 and the first random number R1 are stored in a non-volatile memory of the data processing device DTD, for example a EEPROM memory.

Thus only the processing key K1, and not the secret key K, which was continuously contained in memory in the data processing devices according to the prior art, is stored in memory in the device DTD. The data processing at subsequent steps ET never uses the secret key K in clear, which is not stored in the device DTD.

Figure 2:
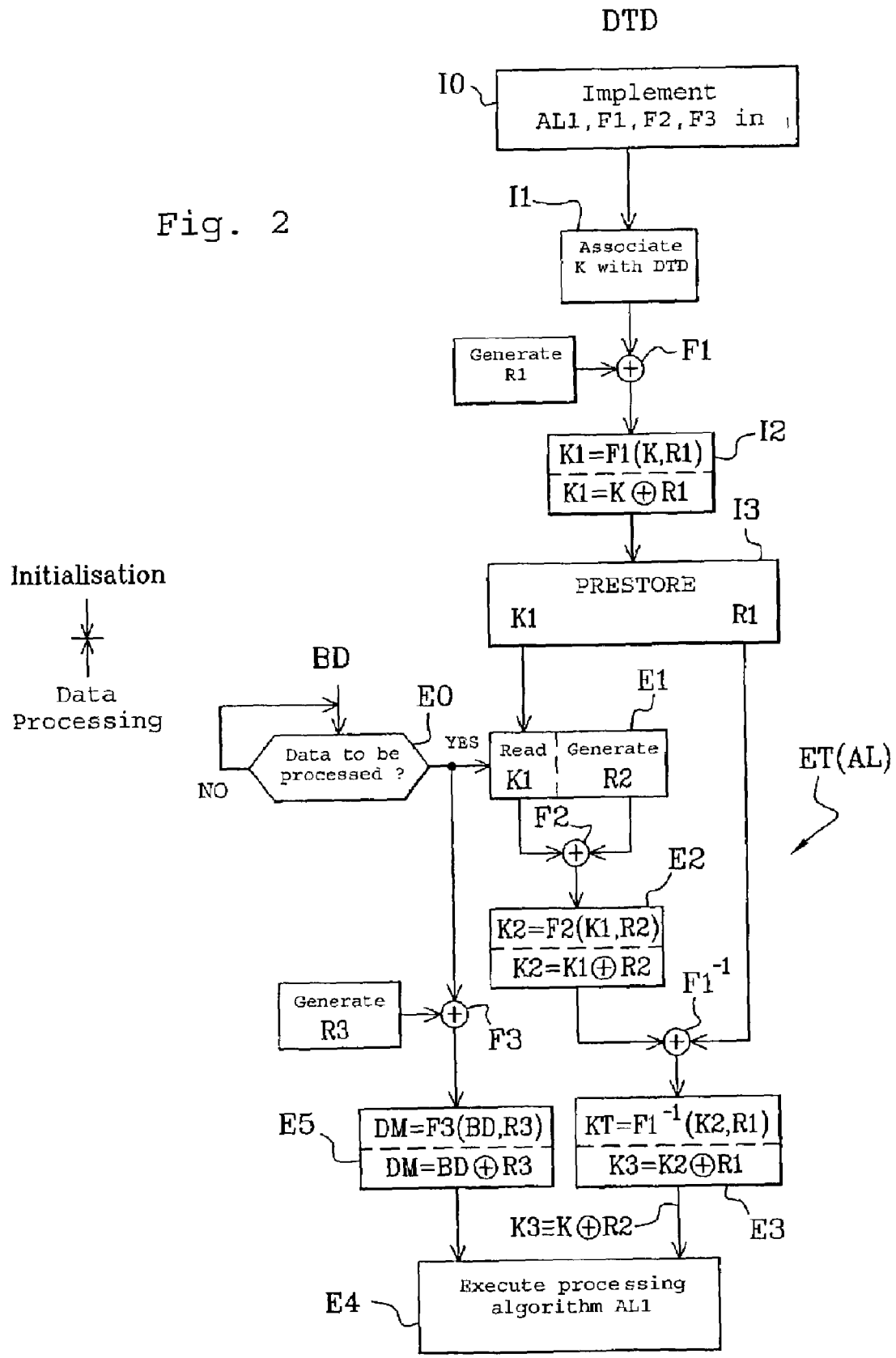
FIG. 2 is a block diagram similar to FIG. 1, detailing a data processing for enciphering according to the first embodiment of the invention.

According to the first embodiment shown in FIG. 2, the processing step ET concerns an enciphering or encrypting of the data, or other similar processing. The step ET comprises the cycle of the data processing steps E1 to E4 which is executed as indicated at the initial step E0 whenever data are to be processed in accordance with a processing algorithm AL1 at step E4 in the device DTD. For example, steps E1 to E4 are performed each time the device DTD is to transmit a processed data block BD to the outside world, for example to an host terminal when the device DTD is a smart card, or whenever an operation is to be performed on a data block.

When the processor constituting the central processing unit of the data processing device decides to process data at step E0, a second random number R2 is generated and the first key K1 which had been prestored at step I3 is read in the non-volatile memory, at step E1. The first key K1 and the first random number R1 are applied to a second function F2 in order to produce a result K2=F2(K1, R1) at the following step E2. The second function F2 was implemented with the first function F1 in the memory of the device DTD at the initial step I0. The result K2 of this application constitutes a second key K2 entered in a register internal to the device DTD.

Then the second key K2 and the first prestored random number R1 are read in order to apply them to a function $F1^{-1}$ which is the inverse of the first function F1 so as to produce a third key $K3=F1^{-1}$ (K2, R1) which is equal to $F1^{-1}$(F2(K1, R2), R1)=$F1^{-1}$(F2(F1(K, R1), R2), R1) that is to say K3=F2 (K, R2).

Finally, at step E4, the data block BD to be processed is read and is applied with the previously produced third key K3 to the data processing algorithm AL1. For example, the data processing algorithm AL1 is a data enciphering algorithm, such as the known algorithm DES (Data Encryption Standard) or RSA (Rivest, Shamir, Adleman), or a compression algorithm, or an authentication algorithm for the device DTD.

Thus the data block BD is processed by the algorithm AL dependent on a key K3 which is a function solely of the secret key K and of the second random number R2 generated in the processing device and therefore different from one data processing BD to the following, so that this third key serving for the processing proper of the data cannot be deduced directly from the first key K1, which is the only one stored permanently in the device DTD.

As a variant, as shown at a step E5 executed in parallel with the step E3 in FIG. 2, the data block BD to be processed and a third random number R3, which is generated by the processor and is a priori different from the second random number R2, are applied to a third function F3 which is also implemented in advance in the device DTD at step I0. The function F3 produces modified data DM=F3(BD, R3), which are processed according to the processing algorithm AL1 according to the third key K3 produced at step E4 according to FIG. 2, or more generally according to a processing of the processing key K1 at the step ET according to FIG. 1.

By way of simple example, the first, second and third functions F1, F2 and F3 are simple logic functions, such as the exclusive OR, for which the inverse function corresponding to the function $F1^{-1}$ is also an exclusive OR. Thus, at the end of step E3, there is:

K3=((K⊕R1)⊕R2)⊕R1, that is to say K3=K⊕R2.

According to another example, the functions F1 and F2 are additions, the function $F1^{-1}$ which is the inverse of the function F1 being a subtraction.

Figure 3:
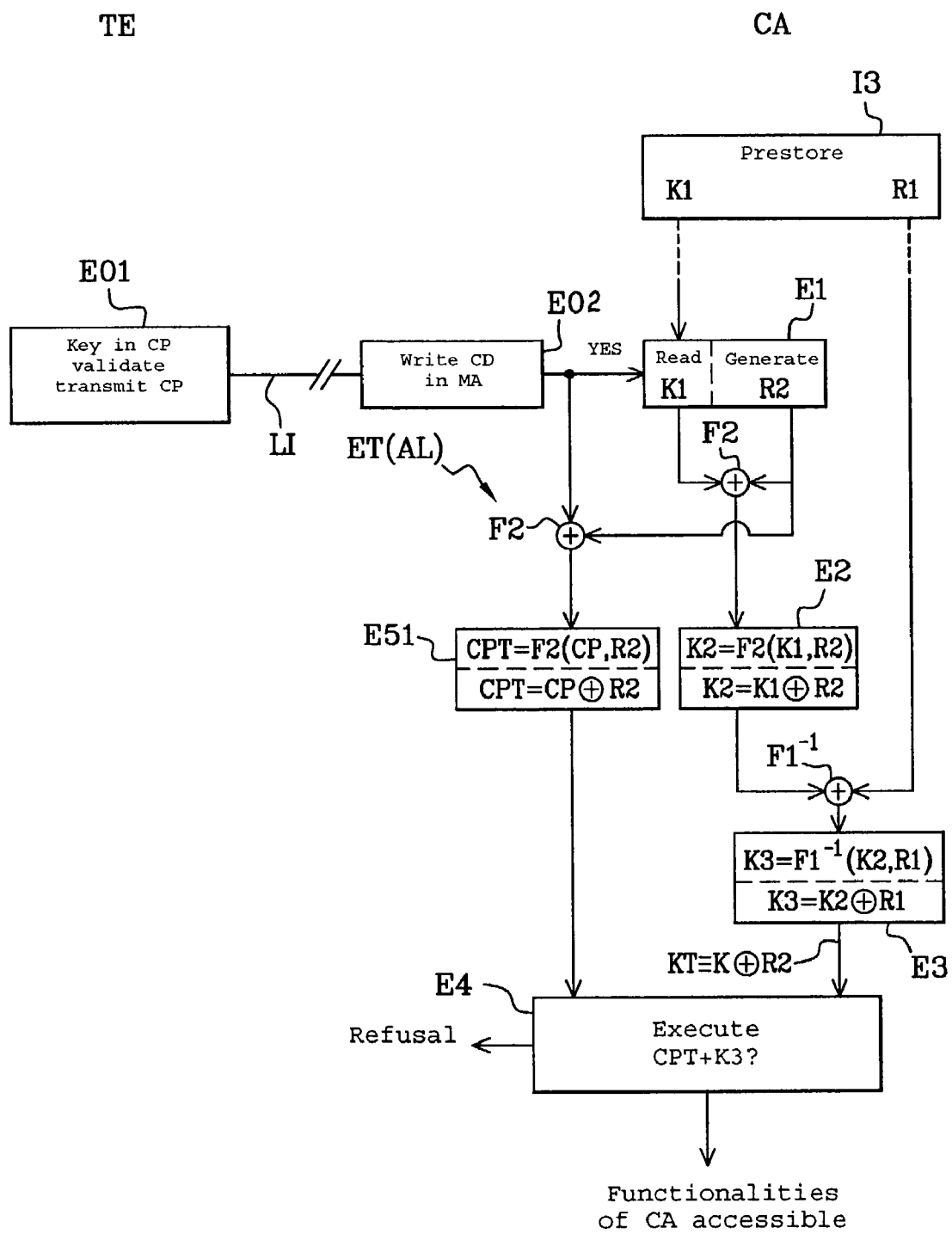
FIG. 3 is a block diagram similar to FIG. 1, detailing a data processing for a confidential code in the context of a smart card as an electronic data processing means, according to the second embodiment of the invention.

According to the second embodiment of the invention shown in FIG. 3, the method of using a processing key serves to increase the security of the control of the confidential code, as a secret key, associated with a chip card CA, also referred to as a microcontroller card or integrated circuit card (Smart Card), as a data processing device, in order to prevent any manipulation of the secret key in the smart card.

Figure 4:
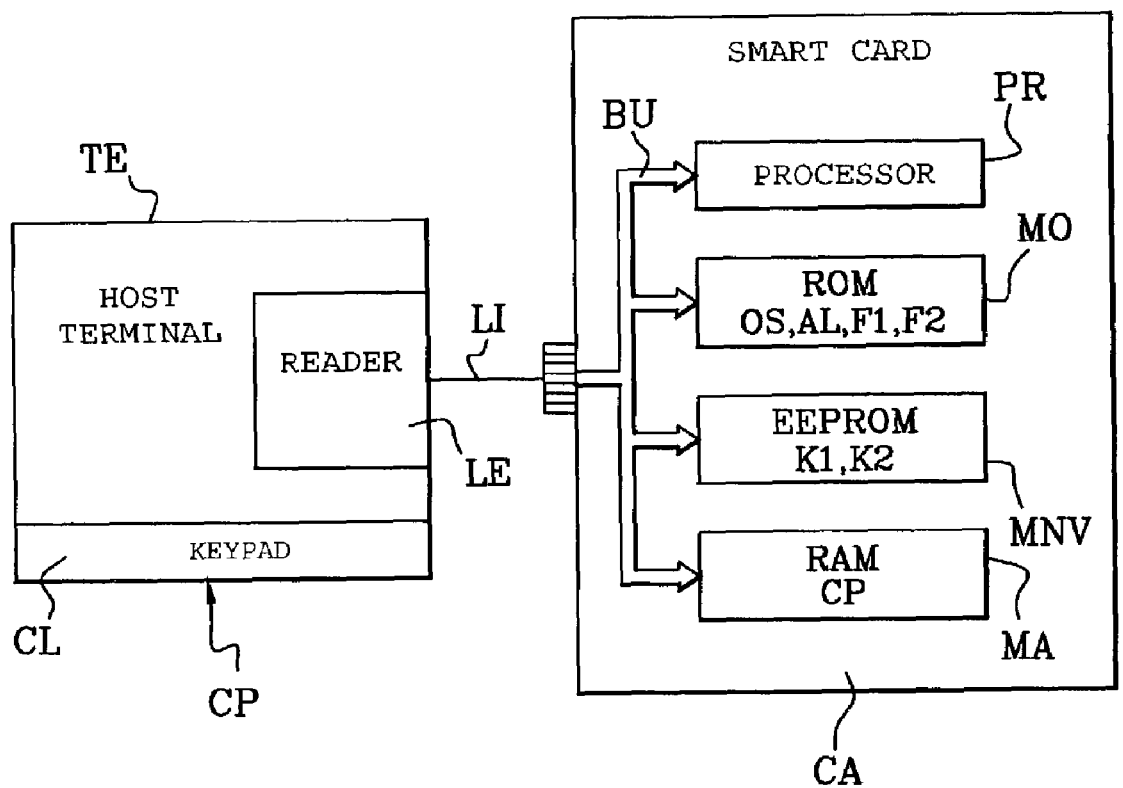
FIG. 4 is a schematic block diagram showing a system for implementing the data processing method according to the invention in the context of a smart card.

It is stated schematically with reference to FIG. 4 that a smart card CA is composed of a microcontroller comprising a central processing unit CPU formed by a microprocessor PR, a memory MO of the ROM type including an operating system OS for the card and in particular specific communication application and authentication algorithms and in this case the data processing algorithm AL and the functions F1 and F2 according to the data processing method of the invention, a non-volatile memory MNV of the programmable and erasable type, such as a EEPROM memory, which contains data in particular related to the possessor of the card and to the supplier of the card, and a memory MA of the RAM type intended to receive in particular data from a card acceptance terminal TE. All the components PR, MO, MNV and MA are connected together by an internal bus BU.

An host terminal TE, such as a bank terminal or a telephone terminal, is equipped with a keypad CL for in particular keying in a confidential code CP, also referred to as a secret code, to be presented to the card. Into a reader LE of the terminal TE there is inserted part of the card CA containing the microcontroller and supporting typically eight electrical contacts of an electrical connection LI between the reader LE and the bus BU internal to the card CA when the card is of the contact type.

Referring to FIG. 3, there are found therein the data processing steps E1 to E3 already described, preceded by the initial steps I0 to I3 according to FIG. 1.

These steps E1 to E3 are executed after an initial step E01 following on from the insertion of the card C1 into the reader LE of the host terminal TE, which is thus connected by the electrical connection LI of the internal bus BU to the microcontroller of the card CA.

At the time of each data processing within the meaning of the invention, corresponding to each use of the card in this smart card context, a presented confidential code CP, which must normally be identical to the secret key K never kept in clear in the card, is keyed in on the keypad CL of the terminal TE at step E0 in order to verify the code presented in the card CA, followed by the pressing of a validation key. Either as the figures of the presented code are keyed in, for example four in number, or in a block, the terminal TE transmits the presented confidential code CP, constituting a data block BD according to FIG. 2, to the card CA through the connection LI and the bus BU so that it is written in the RAM memory MA, at step E02.

The validation of the writing in RAM memory MA of the presented confidential code CP triggers the following steps E1 to E3.

In parallel in particular to step E2, during which the first key K1 and the second random number R2 are applied to the second function F2, the processor PR applies the presented confidential code CP contained in the memory MA and the second random number R2 to the second function F2 in order to produce and store a transformed presented code CPT=F2 (CP, R2) at a step E51. The number R2 is generated by the pseudo-random generator associated with the processor PR.

Finally, at step E4, the processor applies the third key K3=F2(K, R2) which has just been determined at step E3 and the transformed presented code CPT=F2(CP, R2) read in memory, to the processing algorithm AL1, which comprises, according to this second embodiment, a comparison of the third key K3 and the transformed presented code CPT. If the key K3 is identical to the transformed presented code CPT, functionalities of the card CA are accessible through the terminal TE, for example in order to access a service such as a payment service or a telephone service. If not, when the key K3 is different from the code CPT, other attempts at keying in another presented code in a limited number may be made on the keypad CL.

Thus, according to the invention, the secret key K is not stored in the smart card and is therefore not manipulated in the card for each verification of the presented confidential code CP. In addition, although the secret key K is initially combined with the first random number R1 which is constant throughout the use of the card in association with the secret key, the key K3 serving for the comparison is different at each verification for which a random number R2 is generated. This guarantees that the verification of the presented code CP is never executed in the same way in the smart card.

Preferably two smart cards, or more generally two data processing devices associated with identical secret keys, are associated with different first random numbers R1. The random numbers R1 being a priori different for the two cards, the effects of the manipulation of these random numbers cannot serve to characterise the cards.

Preferably, a respective first random number R1 corresponds to each secret key K. Thus, advantageously, when the secret key associated with a card is modified, the first random number R1 is also modified. For example, if two figures of a secret key are reversed, the first two random numbers corresponding to these two secret key versions are different. This variant makes it possible to avoid the recognition of a first random number in a first card by virtue of the manipulation of the random number in another card associated with a secret key common with the first card.

In the above description, it will be understood that the smart card covers all known types of smart card, also referred to as microcontroller cards, such as the contact or contactless cards set out below by way of non-limiting example: credit cards (Visa cards), payment cards, telephone cards, SIM (Subscriber Identity Module) cards, "additional" cards, central purchasing cards, gaming cards etc. More generally, the invention concerns not only smart cards but other portable electronic objects designated indifferently as electronic data processing means or devices, such as electronic assistants or organisers, electronic purses, tokens, pocket calculators etc.

The terminal accepting the electronic data processing means can for example be of the type consisting of a computer terminal, a personal computer, in particular a portable computer, a bank terminal, a point of sale terminal, a radio telephone terminal, a device for controlling access to a room or to a safe etc. The accepting means can be remote from the data processing means, these being connected by any data transmission means. The secret key within the meaning of the invention is also designated in certain contexts as a confidential code, password or secret code, or a personal identification number PIN or CHV (Card Holder Verification) or PTI (Personal Telecommunication Identifier), in particular for radio telephone terminal SIM cards.

The presented confidential code is in general an alphanumeric code. It can be applied to the data processing means, smart card or portable electronic object, by any known code entry means, other than a keypad, for example by voice and voice recognition, or by the recognition of a biometric signature, for example at least one fingerprint.

The invention claimed is:

1. A method for enciphering data in a data processing means, by means of an algorithm that employs a confidential key, comprising the steps of, applying a secret key and a first random number to a first function to thereby generate a first key in the processing means, prestoring the first key and the first random number in non-volatile memory in the processing means, employing said first key and said first random number stored in said non-volatile memory each time data is enciphered with said algorithm in said data processing means, without reference to said secret key, and for each execution of said algorithm to encipher data, said method comprising the steps of generating a second random number, applying the first key and the second generated random number to a second function in order to produce a second key, and applying the second key and the first prestored random number to a function which is the inverse of the first function in order to produce a third key used for the execution of the algorithm.

2. A method according to claim 1, wherein two data processing means associated with identical secret keys have different first random numbers prestored in them, respectively.

3. A method according to claim 1 wherein the first random number is modified when the secret key associated with the processing means is modified.

4. A method according to claim 1, wherein the first and second functions are exclusive-OR functions.

5. A method according to claim 1, further including the step of applying the data to be processed and a third random number to a third function in order to produce modified data that is processed according to a processed version of the first key.

6. The method of claim 5, wherein said processed version of the first key comprises said third key.

7. A method for performing cryptographic operations based upon a secret key, comprising the following steps:
producing a first random number;
performing an operation that is a function of said first random number and said secret key to generate a first processing key;
storing said first random number and said first processing key in non-volatile memory in a data processing device, without storing said secret key in said data processing device; and
thereafter performing cryptographic operations on data in said data processing device, using said first random number and first processing key stored in said non-volatile memory, wherein the step of performing cryptographic operations includes the following steps:
generating a second random number;
performing an operation that is a function of said second random number and said first processing key to produce a second processing key;
applying said first random number and said second processing key to a function that is the inverse of the function used to generate said first processing key, to produce a third processing key; and
performing a cryptographic operation on data using said third processing key.

8. The method of claim 7, further including the steps of:
receiving a confidential code;
applying the confidential code and said second random number to the function used to produce said second processing key, to produce a transformed code,
comparing said transformed code to said third processing key; and selectively inhibiting data processing operations in accordance with the results of said comparing step.

9. A method for performing cryptographic operations based upon a secret key, comprising the following steps:

producing a first random number;

performing an operation that is a function of said first random number and said secret key to generate a first processing key;

storing said first random number and said first processing key in a data processing device;

generating a second random number;

performing an operation that is a function of said second random number and said first processing key to produce a second processing key;

applying said first random number and said second processing key to a function that is the inverse of the function used to generate said first processing key, to produce a third processing key; and performing a cryptographic operation on data using said third processing key.

10. The method of claim 9, further including the steps of:

receiving a confidential code;

applying the confidential code and said second random number to the function used to produce said second processing key, to produce a transformed code, comparing said transformed code to said third processing key; and selectively inhibiting data processing operations in accordance with the results of said comparing step.

11. A smart device comprising:

a memory having stored therein a first processing key and a first random number that was used to generate said first processing key according to a first function; and a processor that applies said first processing key stored in said memory and a second random number to a second function to generate a second processing key, applies said second processing key and said first random number stored in said memory to a function that is the inverse of said first function to generate a third processing key, and performs a cryptographic operation on data using said third processing key.

12. The device of claim 11, wherein said device comprises a smart card.

* * * * *